United States Patent
Tibbott

(10) Patent No.: US 6,644,344 B2
(45) Date of Patent: Nov. 11, 2003

(54) METHOD AND APPARATUS FOR METERING A FLOW RATE OF A FLUID

(75) Inventor: David B. Tibbott, Phillipsburg, NJ (US)

(73) Assignee: Ashland, Inc., Dublin, OH (US)

(*) Notice: Subject to any disclaimer, the term of this patent is extended or adjusted under 35 U.S.C. 154(b) by 0 days.

(21) Appl. No.: 09/852,706

(22) Filed: May 11, 2001

(65) Prior Publication Data
US 2002/0166589 A1 Nov. 14, 2002

(51) Int. Cl.⁷ .............. G01F 1/00; G01F 1/76; G01G 11/08; F17D 3/01
(52) U.S. Cl. .............. 137/403; 137/2; 137/391; 137/624.14; 137/624.18; 73/296; 73/433; 73/861; 141/1; 141/83; 222/1; 222/56
(58) Field of Search .............. 137/391, 392, 137/395, 403, 624.11, 624.14, 624.18, 2, 7, 8, 487.5, 624.13; 141/83, 1; 222/52, 55, 57, 58, 1, 56, 64; 73/296, 313, 433, 1.16, 1.73, 861

(56) References Cited

U.S. PATENT DOCUMENTS

| | | | | | |
|---|---|---|---|---|---|
| 3,353,713 | A | * | 11/1967 | Scott et al. .............. | 222/57 |
| 4,111,272 | A | * | 9/1978 | Ricciardi et al. .............. | 222/71 |
| 4,195,516 | A | * | 4/1980 | Fredericks .............. | 222/64 |
| 5,148,841 | A | * | 9/1992 | Graffin .............. | 141/83 |
| 5,309,955 | A | * | 5/1994 | Torterotot .............. | 141/83 |
| 5,423,455 | A | * | 6/1995 | Ricciardi et al. .............. | 141/83 |
| 5,515,888 | A | * | 5/1996 | Graffin .............. | 141/83 |
| 6,026,837 | A | * | 2/2000 | Chen .............. | 137/403 |
| 6,123,765 | A | * | 9/2000 | Sinha et al. .............. | 141/83 |
| 6,334,471 | B1 | * | 1/2002 | Graffin .............. | 141/83 |

* cited by examiner

Primary Examiner—George L. Walton
(74) Attorney, Agent, or Firm—Connolly, Bove, Lodge&Hutz

(57) ABSTRACT

A method and apparatus for measuring the flow rate of a fluid based on the fluid weight. A container is provided between a fluid source and a fluid removal system. A valve is arranged between the fluid source and the container, to control the admitting of fluid into the container from the source, and removal of fluid from the container by the removal system. The valve is controlled by a weight-responsive mechanism, which detects a change in weight of the container due to the admitting and removal of fluid, and opens or closes the valve accordingly. A flow rate of the fluid may be determined in terms of a time period between the closing and subsequent opening of the valve.

22 Claims, 7 Drawing Sheets

METHOD AND APPARATUS FOR METERING A FLOW RATE OF A FLUID

BACKGROUND OF THE INVENTION

The present invention relates to a method and apparatus for efficiently metering the flow of a fluid being removed from a container and, more particularly, to a method and apparatus for metering the flow rate by a weight of the fluid which is delivered per unit of time, in order to allow accurate measurement and control of the amount of fluid being removed.

Fluids which are delivered in bulk quantities for various applications typically utilize metering systems for measuring and controlling the amount of fluid delivered. An example of such an application is in the delivery of water treatment chemicals to cooling towers, boilers and other similar systems. Such an application would typically use a fluid delivery system such as a metering pump. While metering pumps can be set up to accurately dispense the chemicals, over time the pump may lose accuracy due to conditions such as, but not limited to, changes in inlet or discharge pressure, losing pump prime, outgassing from the fluid product, causing "airlock", or damage to the supply or delivery lines. These conditions can result in a reduction of metering accuracy, or even stopping fluid delivery entirely.

In view of the foregoing, there is a need to verify that a fluid delivery system is functioning and how much fluid it has actually delivered. One existing system for metering fluid uses a volumetric method to measure fluid delivery. However, a volumetric system has disadvantages. For example, because fluid density and therefore volume are functions of temperature, equipment for measuring fluid in a volumetric system may need to be calibrated for temperature. Therefore, variations in temperature during product delivery over a period of time can introduce inaccuracies into measurement.

Accordingly, a metering system is needed which is easily repeatable and maintains accuracy over a range of temperatures.

SUMMARY OF THE INVENTION

A method and apparatus according to the present invention provides for improved accuracy of measurement of a rate of fluid delivery. A weight of a fluid being delivered is measured in timed cycles to provide for greater accuracy of measurement over a range of temperatures.

In a preferred embodiment, a metering device is connected between a fluid source and a fluid removal system such as a pump. The device includes an intermediary container having an inlet from the fluid source controlled by a valve. Weight-responsive means engaging the container control the valve to admit fluid into the container from the source. The weight-responsive means detect a change in the weight of the content of the container due to the fluid, and close the valve in response to the change in weight. The fluid removal system subsequently removes fluid from the container. The weight-responsive means detect a change in the weight of the container due to the removal of fluid, and subsequently re-open the valve to admit fluid. Repeating time periods between the closing and opening of the valve can thus be used for measurement of the fluid flow rate in terms of its weight.

DETAILED DESCRIPTION OF THE INVENTION

Figure 1:
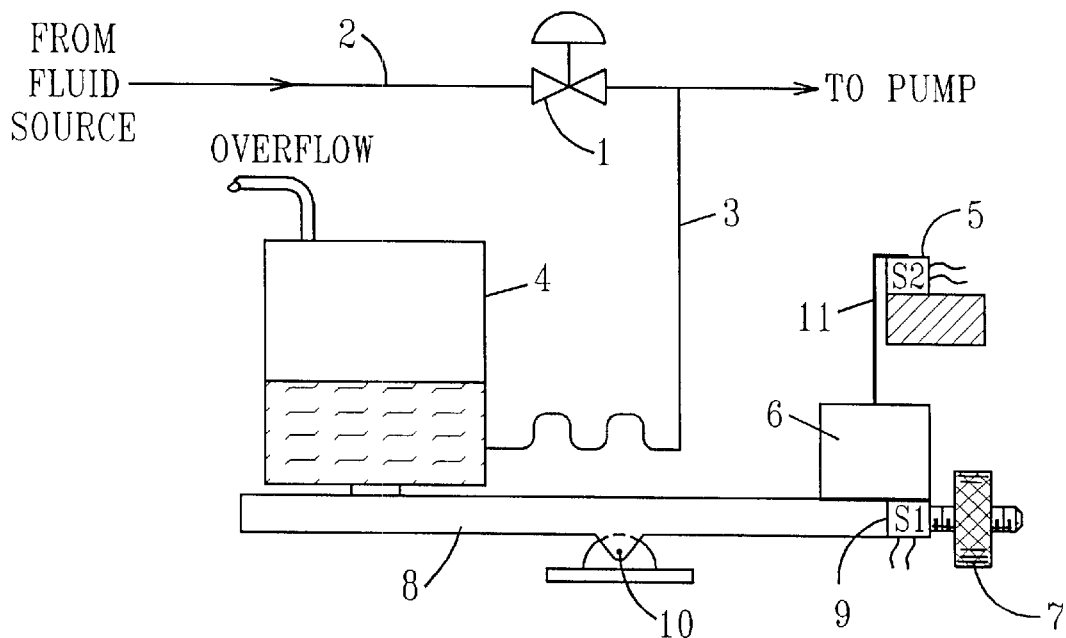
FIG. 1 shows a metering device according to the present invention in a state in which an intermediary container is being filled with fluid from a bulk fluid source.

Referring now to FIG. 1, an embodiment of a metering device according to the present invention is shown. The metering device comprises a valve 1 in a feed line 2 connected between a bulk fluid source (not shown) and a fluid removal system such as a pump (not shown). A feed line 3, which may be a flexible connection, is connected to the feed line 2 between the valve 1 and the pump, and also connected to an intermediary container 4.

The container 4 is engaged by weight-responsive means for controlling the opening and closing of the valve 1 based on a change in weight of the container 4. In an embodiment, the weight-responsive means includes a weight-triggered device such as balance arm 8. The container 4 is positioned at one end of the balance arm 8. At the other end of the balance arm 8, a fixed weight 6 and an adjustable weight 7 are positioned. The balance arm is pivotable about a pivot point 10.

The weight-responsive means further include a separable fixed weight 6 having a member 11, an adjustable weight 7, and control switches 5 (S2) and 9 (S1). In FIG. 1, member 11 is shown in contact with control switch 5. The fixed weight 6 is in contact with control switch 9 on the balance arm 8.

Adjustable weight 7 may be provided for adjusting the metering device in accordance with the fluid density in order to compensate for fluid products of different densities, but it is noted that adjustable weight 7 is not necessary to the operation of the metering device.

A description of a metering process according to the invention follows. In a phase of the process, the metering device may have the state shown in FIG. 1. In FIG. 1 control switches 5 and 9 are both ON, causing valve 1 to be open. When valve 1 is open, fluid flows from the source, for example, by means of a gravity feed, through feed line 2, through the valve 1, through feed line 3 and into the container 4.

Figure 2:
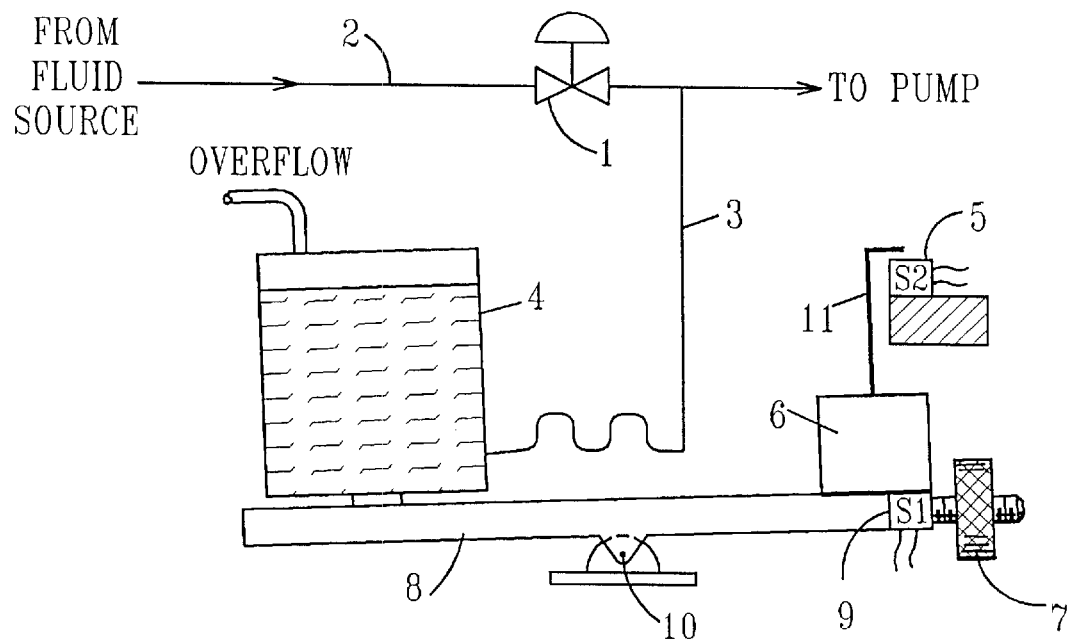
FIG. 2 shows the metering device in a state in which a control switch has opened in order to shut off an inlet valve from the fluid source.

When sufficient fluid has entered the container 4, the metering device may assume the state shown in FIG. 2. In FIG. 2, sufficient fluid has been delivered to the container 4 that the container 4 is heavier than the combined weight of the fixed weight 6 and the adjustable weight 7, causing the balance arm 8 to pivot about pivot point 10 in a counter-clockwise direction. The pivoting of the balance arm causes member 11 to break contact with control switch 5, turning switch 5 OFF.

Figure 3:
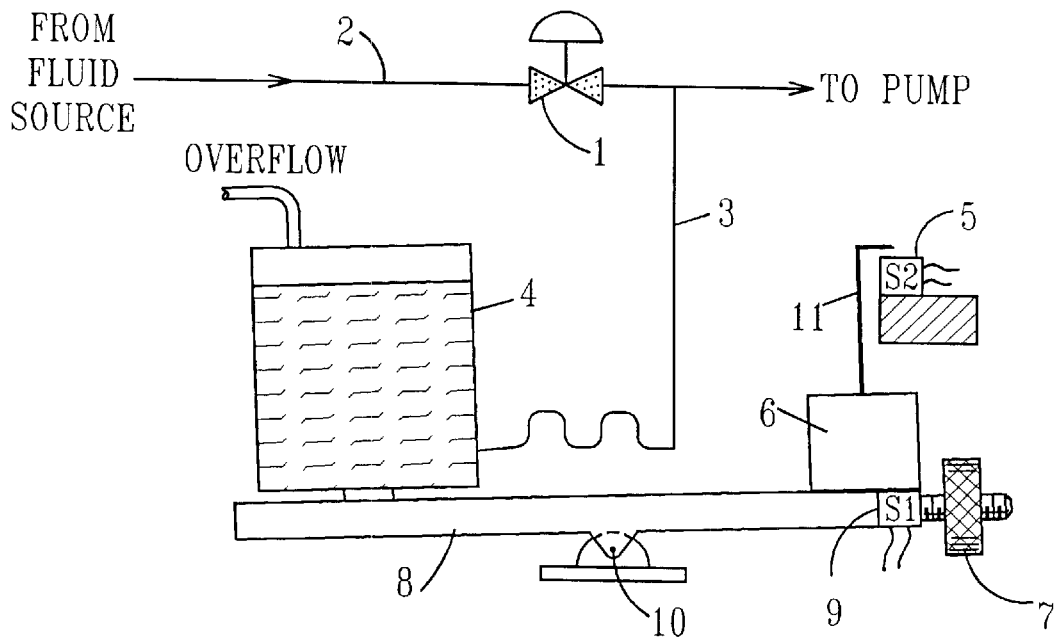
FIG. 3 shows the metering device in a state in which the inlet valve from the fluid source is closed, and fluid is being pumped from the container.

When control switch 5 changes from ON to OFF, the metering device may assume the state shown in FIG. 3. In FIG. 3 valve 1 is closed and thus no fluid enters the container 4 from the fluid source.

Figure 4:
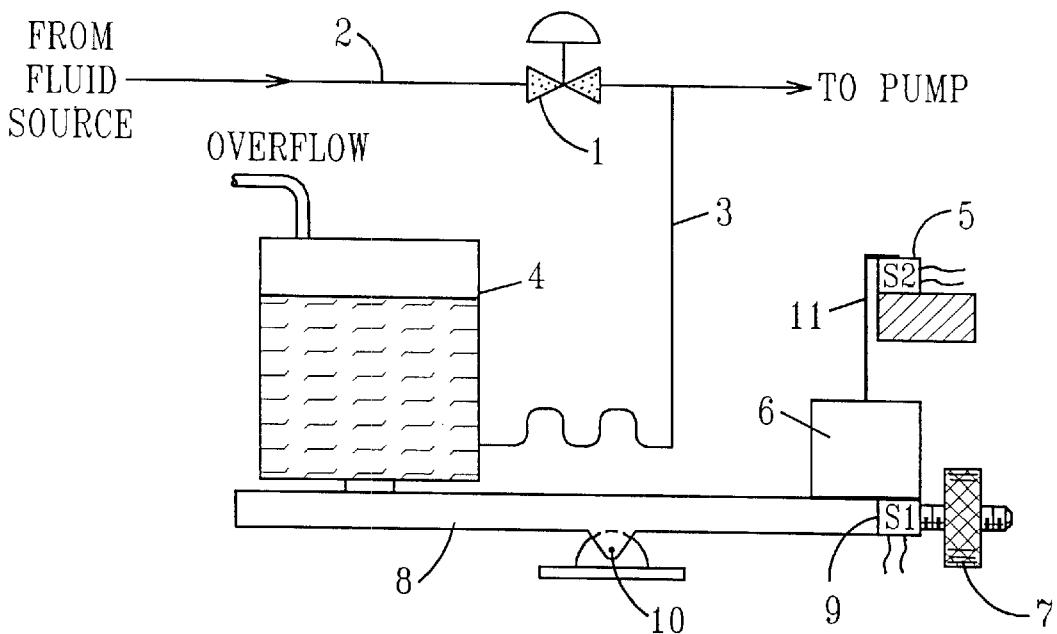
FIG. 4 shows the metering device in a state in which enough fluid has been offloaded from the container to close a control switch.

Fluid may then be removed from the container 4 using the pump. In FIG. 4 sufficient fluid has been removed from the container 4 that the content of container 4 has substantially the same weight as the combination of fixed weight 6 and adjustable weight 7, causing balance arm 8 to pivot in a clockwise direction. The pivoting of the balance arm 8 brings member 11 into contact with control switch 5, turning control switch 5 ON. Control switch 9 has remained ON due to its contact with fixed weight 6.

In typical actual practice, the closing of the valve 1 is not instantaneous and pressure from the fluid source is a factor in causing fluid to continue to enter the container 4 during the transition from the state shown in FIG. 2 to the state shown in FIG. 3. Accordingly, for repeatability and accuracy of measurement, a timing cycle for measuring the rate of fluid removal from the container 4 would preferably begin substantially at the instant the device assumes the state shown in FIG. 4, when the container 4 and weights 6 and 7 are balanced. It is noted that the moment arms between the centers of gravity of the container 4 and weight 6 may not be equal.

Figure 5:
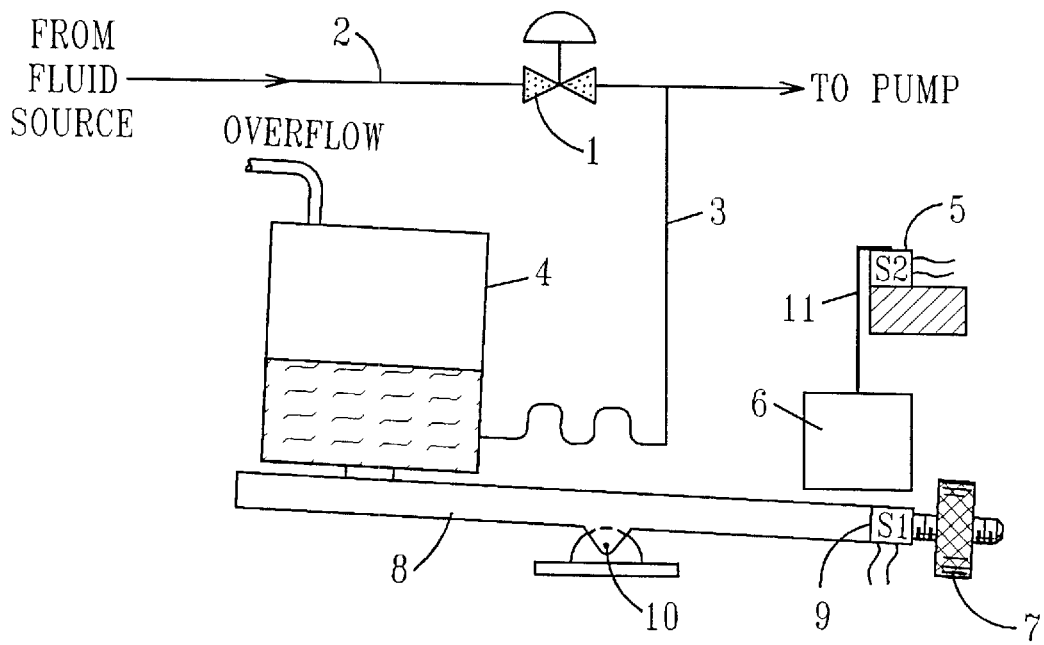
FIG. 5 shows the metering device in a state in which enough fluid has been offloaded from the container to disconnect a different or separate control switch to trigger the opening of the inlet valve.

After sufficient fluid has been removed from container 4, the metering device may assume the state shown in FIG. 5. In FIG. 5 sufficient fluid has been removed from container 4 that container 4 is now lighter than adjustable weight 7. This condition causes balance arm 8 to rotate in a clockwise direction sufficiently to break the contact between control switch 9 and fixed weight 6, turning control switch 9 OFF. Control switch 5 remains ON due to its contact with member 11. When the metering device assumes the state shown in FIG. 5, measurement of the timing cycle may end.

Figure 6:
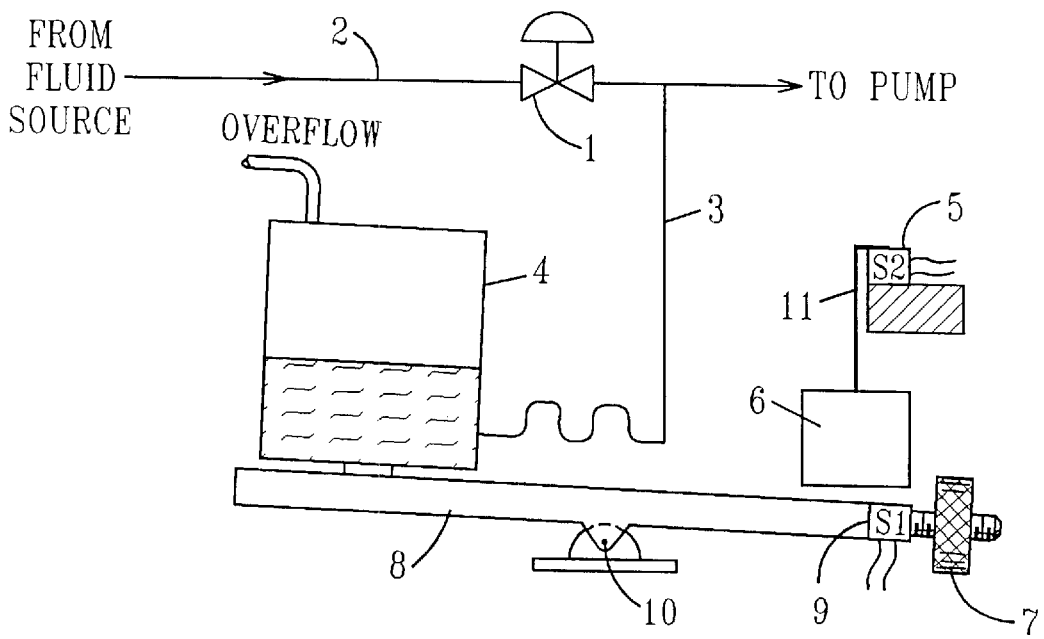
FIG. 6 shows the metering device with the inlet valve from the source open for refilling the container.

When control switch 9 is turned OFF, the valve 1 is again opened as shown in FIG. 6. When the valve 1 is opened, fluid again flows from the fluid source through the feed line 2, the valve 1 and feed line 3 into the container 4 to refill the container 4. Subsequently, the metering device resumes the state shown in FIG. 4 and an identical measuring cycle begins.

Figure 7:
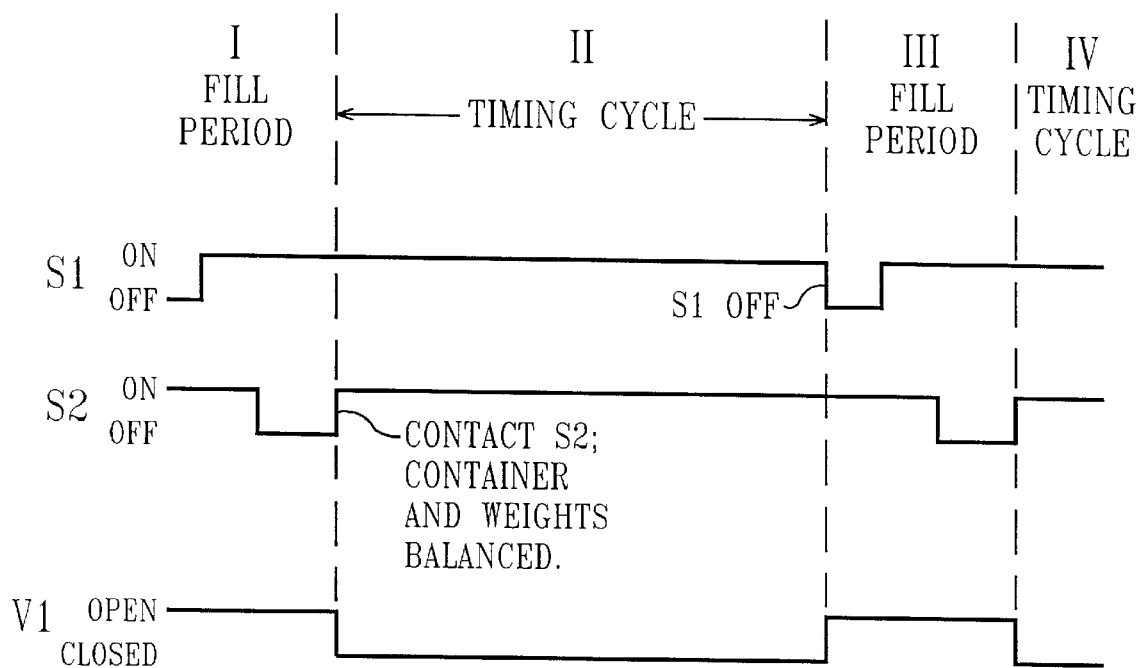
FIG. 7 shows a timing diagram for switches for controlling the opening and closing of the inlet valve and for determining a timing period for measuring flow rate of the fluid.

A timing diagram for control switches 9 and 5 (S1 and S2, respectively) is shown in FIG. 7. A fill period I corresponds to the states of the metering device shown in FIG. 6 through FIGS. 1, 2 and 3, in that order. At the end of a cycle as shown in FIG. 5, S1 is OFF and S2 is ON, causing valve 1 to be open and fluid to enter the container 4 from the fluid source, as shown in FIG. 6. Then, when enough fluid enters container 4, balance arm 8 pivots to bring S1 into contact with fixed weight 6 as shown in FIG. 1, and filling of container 4 continues. As noted above, because the valve typically does not close instantaneously, the fill period I may include a period in which fluid continues to enter the container 4 while the valve is closing as shown in the transition from FIG. 2 to 3.

Next, in time period II, measurement of a repeatable time versus change-in-weight cycle begins. The time period is triggered by S2 being turned ON as shown in FIG. 4. When S2 is turned ON following the closing of valve 1, the container 4 and the known weights 6 and 7 are substantially balanced. Subsequently, fluid is removed from container 4 until contact is broken with S1 as shown in FIG. 5. The time between S2 turning ON and S1 turning OFF is measured, and the weight of fluid removed during that time can be calculated since the moment arms between the pivot point 10 and centers of gravity of the container 4 and weights 6 and 7 are known.

When contact is broken with S1, causing valve 1 to open and allow fluid to enter container 4 again, a fill period III identical to fill period I begins. Then, a timing cycle IV identical to timing cycle II is entered. Alternating fill periods followed by timing periods identical to periods I and III, and II and IV, respectively, may continue as long as fluid is being pumped.

Figure 8:
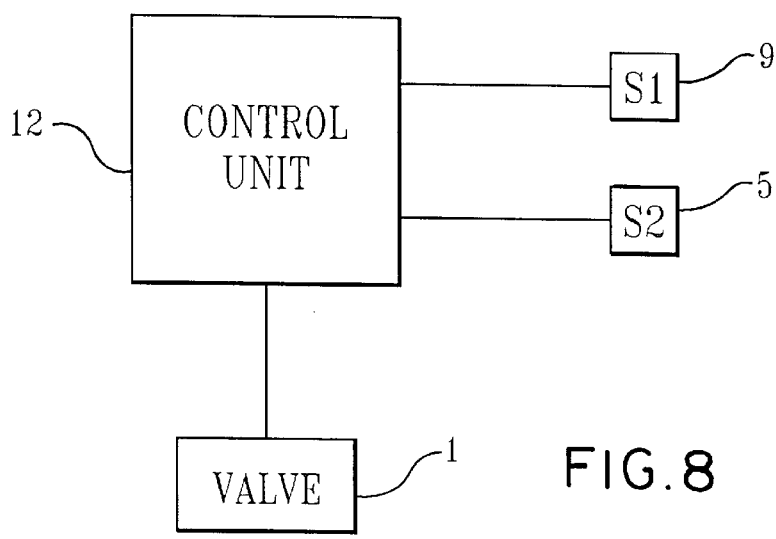
FIG. 8 shows a control system for the metering device.

A possible control system for controlling the opening and closing of the valve 1 and measuring time periods therebetween is shown in FIG. 8. In FIG. 8, a control unit 12, which could be embodied, for example, as a microprocessor is shown. The control unit 12 is connected to switches S1 and S2 and valve 1. The control unit would include time measurement capabilities, calculation capabilities, and control capabilities for turning valve 1 on and off in response to changes in state of switches S1 and S2 as shown in the timing diagram in FIG. 7.

In a preferred embodiment, the time periods when the valve 1 is open and the intermediary container 4 is being refilled, as shown in periods I and III, are short compared with the time spent pumping fluid from container 4, as shown in periods II and IV.

Alternative methods for programming the above-described control system could be used. For instance, continuous pumping at a constant rate could be assumed. In this case, fluid could be pumped both from the fluid source and the container 4 during fill periods. The control system would be programmed to measure the time periods between S2 turning ON following the closing of the valve, and S1 turning OFF, calculate the weight of the fluid removed during that time, and calculate the corresponding rate of fluid removal. The time for the fill period would also be measured, and the weight of fluid removed would be assumed to correspond to the calculated flow rate. For example, if a fill period was one minute long, and a time period between S2 ON and S1 OFF was 9 minutes and 9 pounds of fluid was pumped, a flow rate of 1 pound per minute would be calculated.

Alternatively, the control system could be programmed to control the pump to operate only when the valve 1 was fully closed following the filling of container 4. In this way, it would be assured that fluid was only being removed from the container. Means also exist for controlling the fluid source to ensure that a negligible amount of fluid enters the container during the closing of the valve. This would permit calculations based on the assumption that the container 4 and the weights 6 and 7 are substantially balanced immediately following the breaking of contact with S1 as shown in FIG. 2 to be reasonably accurate.

Other possible embodiments for the metering device include using two valves, or a larger valve, to fill the container 4, to ensure that container 4 fills at a much greater rate than it empties.

Also, instead of weights 6 and 7 as described above, force-exerting means such as an adjustable spring could be used in connection with a pivoting end of the balance arm 8, to exert a force on the pivoting end. The spring would extend within a short range which would cause it to exert an essentially linear force. Because the switch points are stationary, the metering process would be repeatable.

An embodiment using an adjustable spring is illustrated in FIGS. 9–14. The status of switches 5 (S2) and 9 (S1) in FIGS. 9–14 correspond to the status of the same-numbered switches in FIGS. 1–6, respectively. However, the weight responsive means utilizes an adjustable spring 15 connected to a pivoting end of the balance arm, rather than weights 6 and 7.

Figure 9:
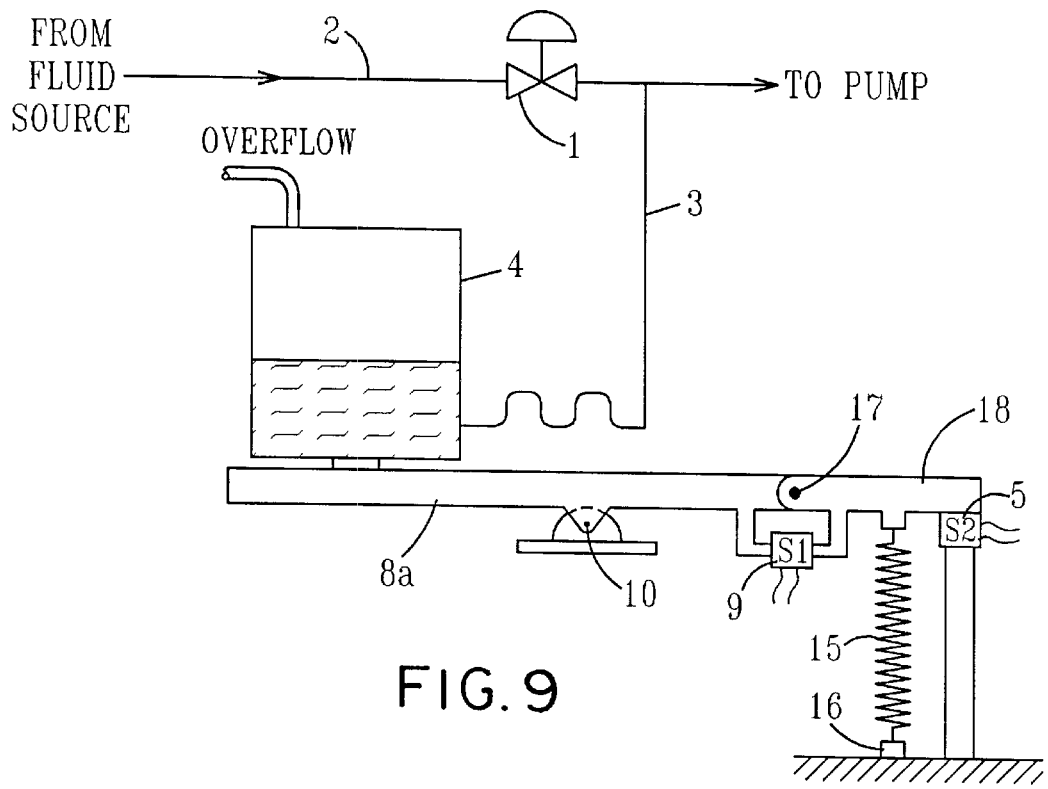
FIGS. 9–14 show an alternative embodiment for the metering device.

As can be seen in FIG. 9, adjustable spring 15 is connected between an end of balance arm 8a and a fixed point 16. The spring is connected to a pivoting end 18 of balance arm 8a. Pivoting end 18 pivots about a second pivot point 17.

In FIG. 9, the metering device is in a state in which pivoting end 18 is in a non-pivoted state, causing it to be in contact with both switch 5 and switch 9. Thus, switches 5 and 9 are both on, allowing fluid to enter container 4 from a fluid source.

Figure 10:
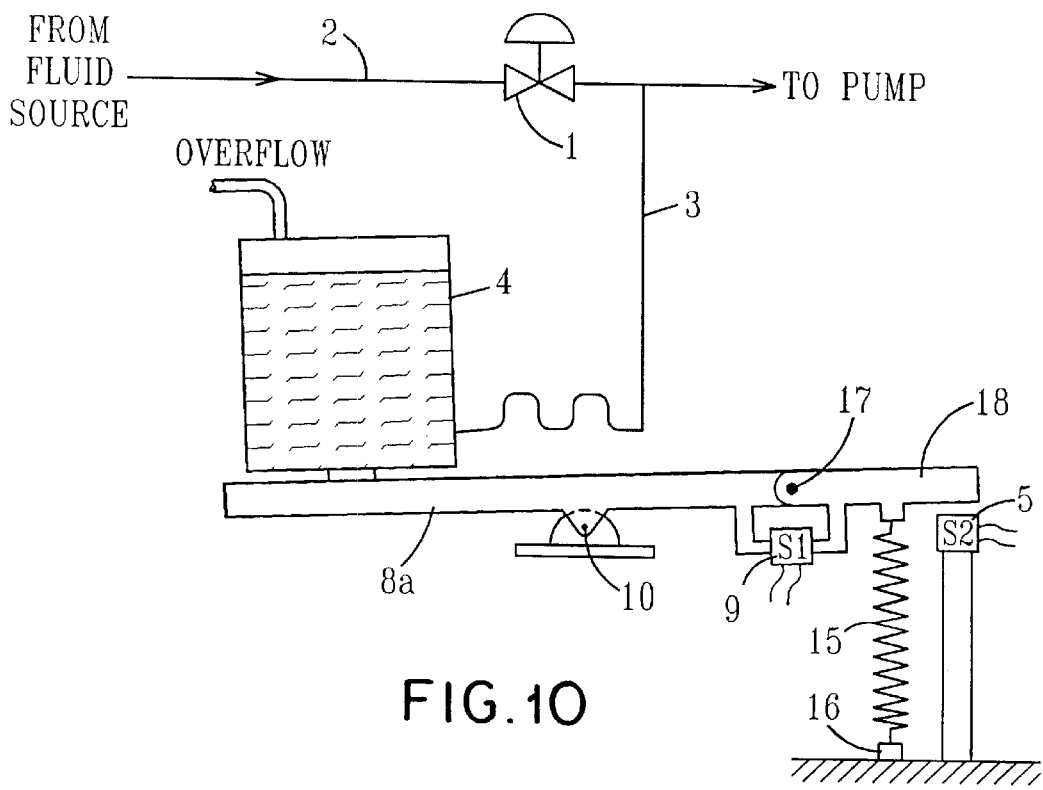
Figure 11:
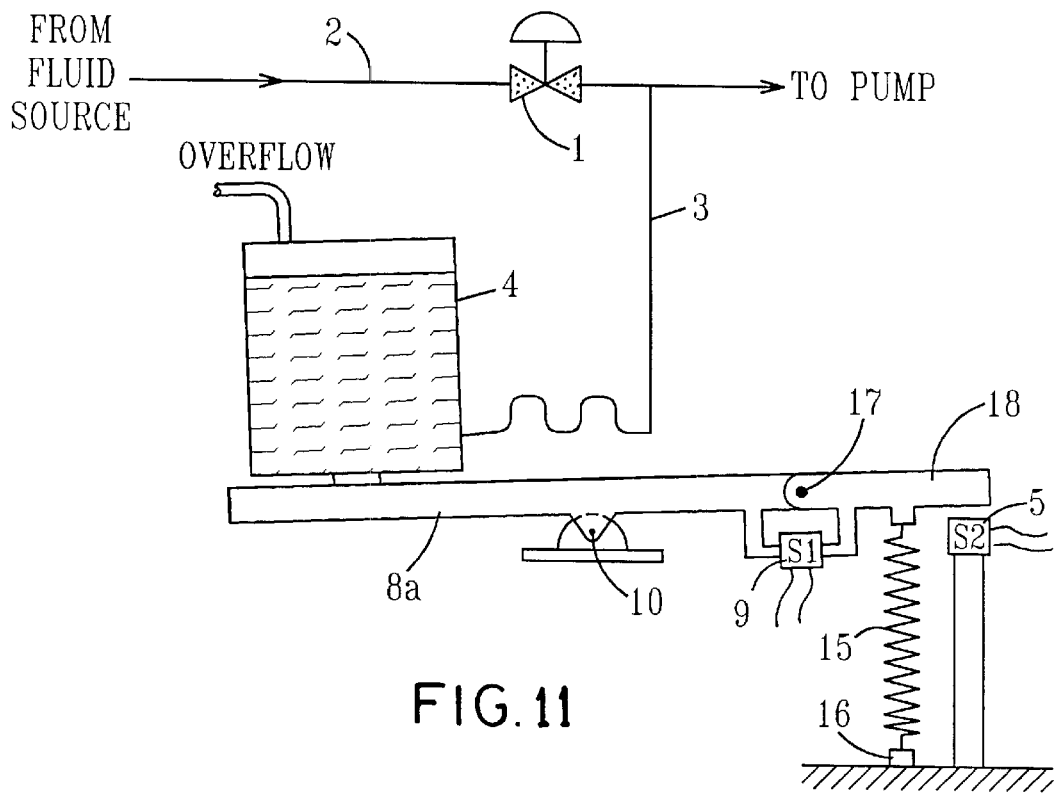

Subsequently, as shown in FIG. 10, sufficient fluid has entered container 4 to cause pivoting end 18 of balance arm 8a to break contact with switch 5, while switch 9 is still on. The change in switch 5 from an ON status to an OFF status causes valve 1 to close so that the metering device assumes the state shown in FIG. 11. Pivoting end 18 is still in a non-pivoted state.

Figure 12:
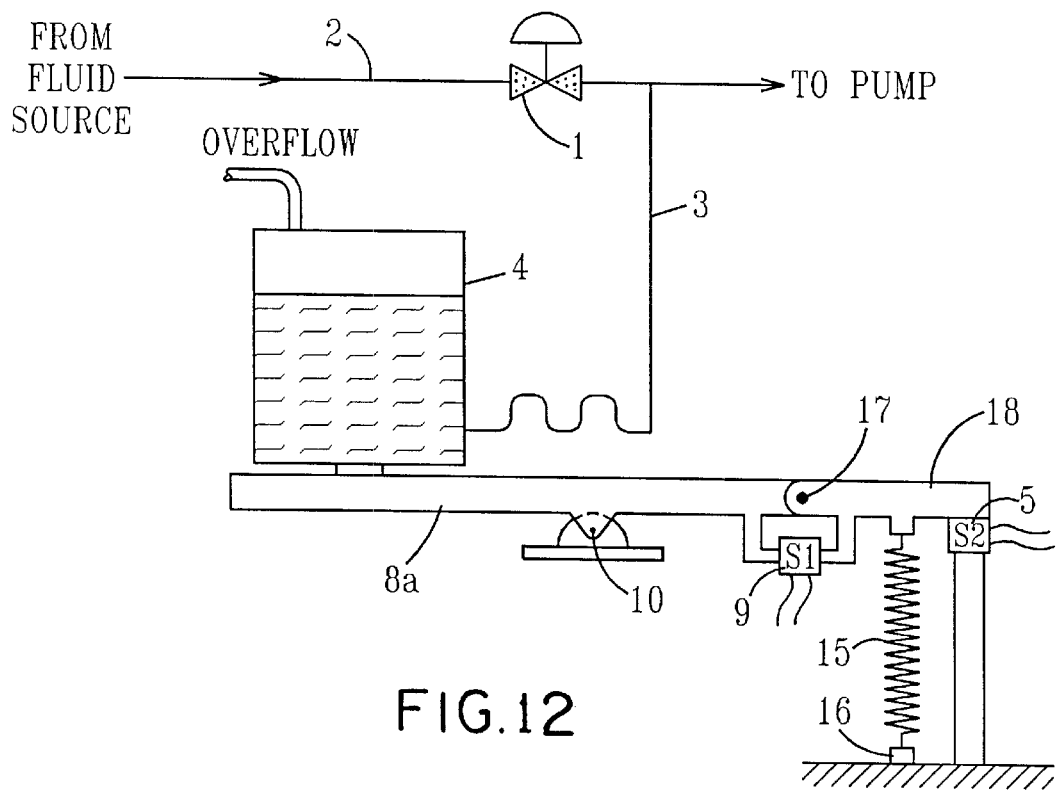

Fluid is then removed by pumping from container 4 through line 3, causing contact to be reestablished with switch 5 as shown in FIG. 12. At this point, a timing cycle for measurement of the rate of removal of fluid from container 4 would begin.

Figure 13:
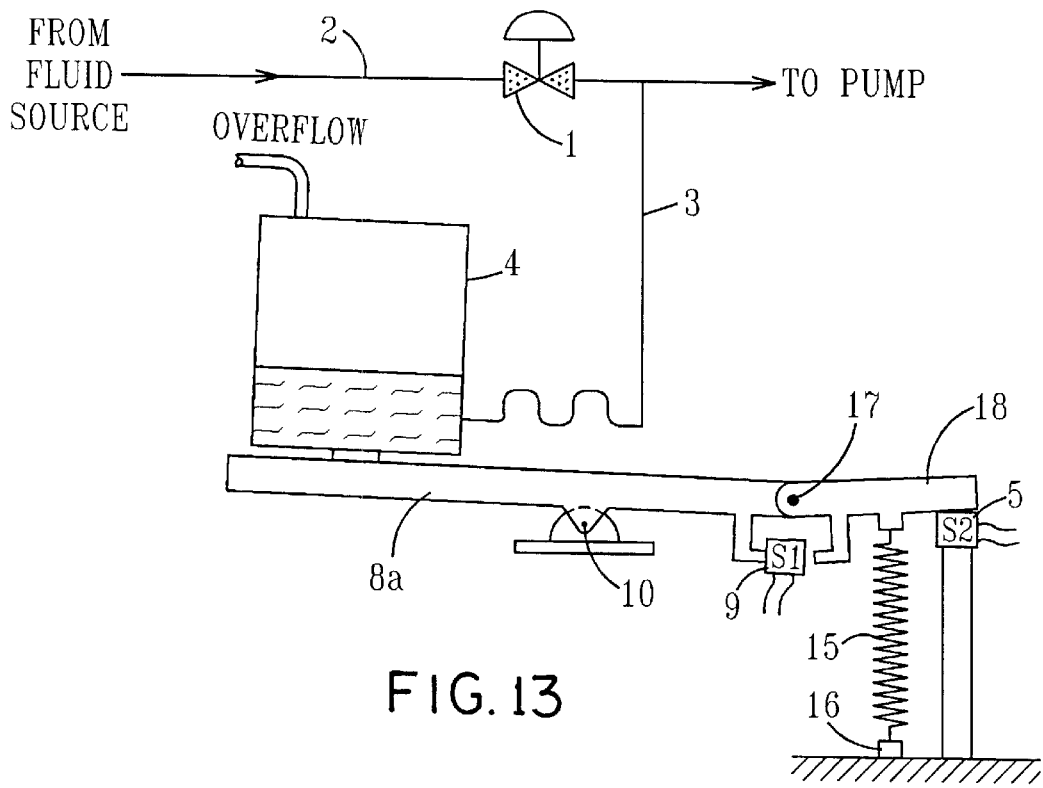
Figure 14:
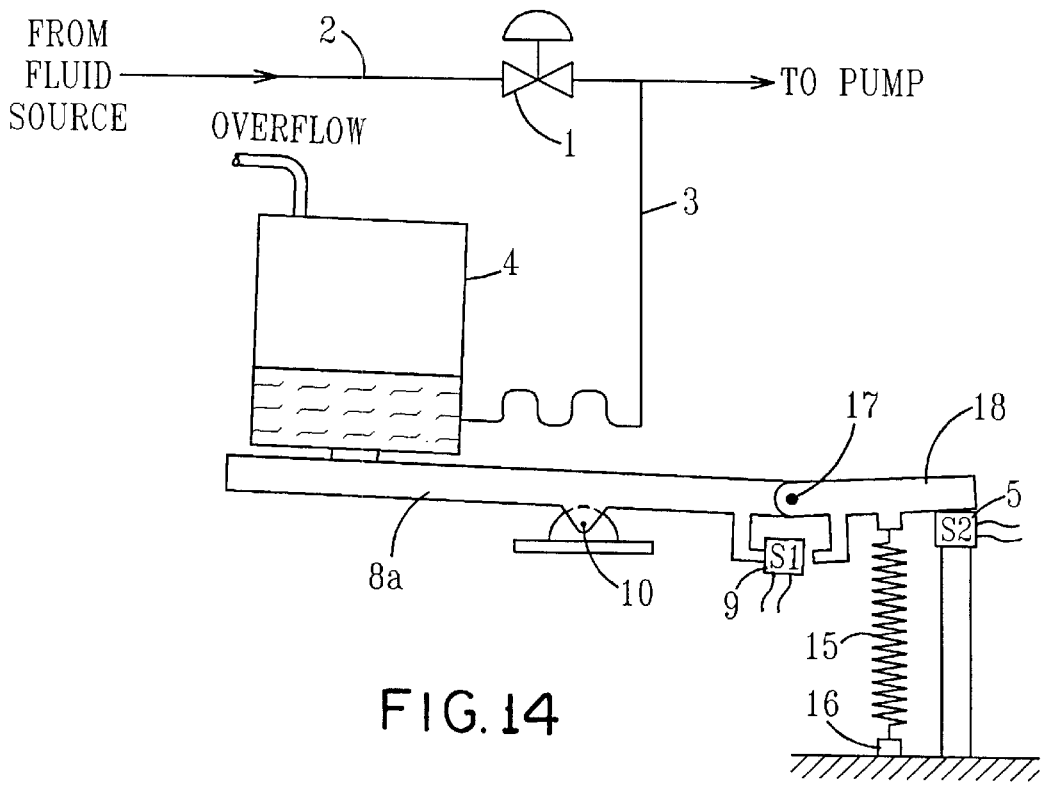

As shown in FIG. 13, as fluid is removed from container 4, adjustable spring 15 exerts a linear pressure on pivoting end 18 of balance arm 8a, causing it to pivot in a counter-clockwise direction about second pivot point 17, thereby breaking contact with switch 9, while switch 5 remains on. When switches 5 and 9 assume this state, valve 1 opens again as shown in FIG. 4 to permit re-filling of container 4.

As timing diagram for the embodiment shown in FIGS. 9–14 would be the same as that shown in FIG. 7.

In yet another embodiment of the invention, the adjustable spring 15 shown in the embodiment described in FIGS. 9–14 could be replaced by a weight.

It may be appreciated from the foregoing discussion that the metering device described in the foregoing provides for an easily repeatable method of determining a flow rate of a fluid based upon the weight of the fluid, and therefore offers improved accuracy of measurement over a range of temperatures.

The foregoing description of the invention illustrates and describes the present invention. Additionally, the disclosure shows and describes only the preferred embodiments of the invention, but is to be understood that the invention of capable of use in various other combinations, modifications, and environments and is capable of changes or modifications within the scope of the inventive concept as expressed herein, commensurate with the above teachings and/or the skill or knowledge of the relevant art. The embodiments described hereinabove are further intended to explain best modes known of practicing the invention and to enable others skilled in the art to utilize the invention in such, or other, embodiments and with the various modifications required by the particular applications or uses of the invention. Accordingly, the description is not intended to limit the invention to the form disclosed herein. Also, it is intended that the appended claims be construed to include alternative embodiments.

What is claimed is:
1. A metering device comprising:
   a valve connected between a fluid source and a container;
   a weight-responsive means opening and closing said valve to control an amount of fluid supplied by said source to said container, said weight-responsive means comprising a balance arm and at least first and second switches, wherein;
   said container is arranged at a first end of said balance arm;
   pre-determined changes in weight of said container set a status of said first and second switches by causing said balance arm to establish or break contact with either of said first and second switches to open or close said valve; and
   the status of said first and second switches provides an indication of one of a filling period, during which said container is filled with fluid, and a timing cycle, during which fluid is removed from said container a flow rate of said fluid is measured.
2. The metering device of claim 1, said balance arm having a first pivot point between said container and a separable pre-determined weight arranged at a second end of said balance arm.
3. The metering device of claim 2, said pre-determined weight comprising a fixed weight and an adjustable weight.
4. The metering device of claim 2, wherein said first switch is arranged at said second end, and a difference in weight between said container and said pre-determined weight causes said balance arm to rotate about said pivot point and separate said first switch from said pre-determined weight.
5. The metering device of claim 2, wherein said pre-determined weight includes a member for contacting said second switch, and a difference in weight between said container and said pre-determined weight causes said balance arm to rotate about said pivot point and separate said member from said second switch.
6. The metering device of claim 1, wherein said balance arm comprises a pivoting end connected to a force-exerting means.
7. The metering device of claim 6, wherein in a non-pivoted state, said pivoting end is in contact with said first switch.
8. The metering device of claim 7, wherein said force-exerting means exerts a force on said pivoting end such that said pivoting end pivots about a second pivoting point to break contact with said first switch.
9. The metering device of claim 6, wherein said force-exerting means is a spring.
10. The metering device of claim 6, wherein said force-exerting means is a weight.
11. A method comprising:
    arranging a container on a balance arm between a fluid source and fluid removal means;
    arranging a valve between said container and said fluid source;
    opening and closing said valve based on a status of first and second switches to control admitting of fluid to said container from said source;
    moving said balance arm to establish or break contact with either of said first and second switches, and thereby setting the status of said first and second switches, in response to pre-determined changes in weight of said container caused by the admitting of fluid to said container and removal of fluid from said container; and measuring a flow rate of said fluid based on a change in the weight of said container during a timing cycle, wherein said timing cycle is indicated by the status of said first and second switches.

12. The method of claim 11, wherein measuring a flow rate comprises:

opening said valve to admit fluid from said source into said container;

closing said valve upon detecting a pre-determined change in weight of said container due to said fluid.

13. The method of claim 12, wherein measuring said flow rate further comprises:

after closing said valve, removing fluid from said container to effect a change in weight of said container;

performing a subsequent opening of said valve upon detecting a pre-determined change in weight of said container; and measuring a time period between said closing and subsequent opening.

14. The method of claim 12, wherein detecting a pre-determined change in weight of said container is based on a difference between a weight of said container and a force exerted by a force-exerting means.

15. The method of claim 12, wherein detecting a pre-determined change in weight of said container is based on a difference between a weight of said container and a force exerted by a force-exerting means.

16. The method of claim 14, further comprising adjusting said pre-determined weight to correspond to a density of said fluid.

17. A method comprising:

providing a container on a balance arm between a fluid source and fluid removal means;

providing a valve in a feed line between said fluid source and said container, said valve when open allowing fluid from said source to enter said container, and when closed allowing said removal means to remove said fluid, said valve being open or closed based upon a status of first and second switches;

varying an amount of fluid in said container and thereby causing a change in a weight of said container, by causing fluid from said source to enter said container and removing fluid from said container with said removal means;

moving said balance arm in response to a pre-determined change in the weight of said container to establish or break contact with either of said first and second switches to set the status of the first and second switches, and thereby controlling opening and closing of said valve; and measuring a flow rate of said fluid based on a change in the weight of said container during a timing cycle, wherein said timing cycle is indicated by the status of said first and second switches.

18. The method of claim 17, wherein moving said balance arm comprises using a difference between the weight of said container and a pre-determined weight.

19. The method of claim 17, wherein moving said balance arm comprises using a difference between the weight of said container and a force exerted by force-exerting means.

20. The method of claim 18, wherein measuring a flow rate of said fluid comprises measuring a time period sufficient to establish said difference between the weight of said container and the pre-determined weight such that a change in the status of said first and second switches is effected.

21. The method of claim 20, wherein said time period is between a closing of said valve and a subsequent opening of said valve.

22. A metering device comprising:

a valve connected between a fluid source and a container;

an adjustable weight-responsive means opening and closing said valve to control an amount of fluid supplied by said source to said container, said adjustable weight-responsive means comprising a balance arm and at least first and second switches, wherein:

said container is arranged at a first end of said balance arm;

pre-determined changes in weight of said container set a status of said first and second switches by causing said balance arm to establish or break contact with either of said first and second switches to open or close said valve; and the status of said first and second switches provides an indication of one of a filling period, during which said container is filled with fluid, and a timing cycle, during which fluid is removed from said container a flow rate of said fluid is measured.

* * * * *